US011899952B2

United States Patent
Goss et al.

(10) Patent No.: US 11,899,952 B2
(45) Date of Patent: Feb. 13, 2024

(54) LOSSLESS NAMESPACE METADATA MANAGEMENT SYSTEM

(71) Applicant: Seagate Technology LLC, Fremont, CA (US)

(72) Inventors: Ryan James Goss, Prior Lake, MN (US); David W. Claude, Loveland, CO (US); Daniel J. Benjamin, Savage, MN (US); Thomas V. Spencer, Ft. Collins, CO (US); Matthew B. Lovell, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 49 days.

(21) Appl. No.: 17/515,021

(22) Filed: Oct. 29, 2021

(65) Prior Publication Data

US 2022/0137844 A1    May 5, 2022

Related U.S. Application Data

(60) Provisional application No. 63/198,610, filed on Oct. 29, 2020.

(51) Int. Cl.
*G06F 3/06* (2006.01)

(52) U.S. Cl.
CPC .......... *G06F 3/0634* (2013.01); *G06F 3/0613* (2013.01); *G06F 3/0617* (2013.01); *G06F 3/0653* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,417,570 B2 | 8/2008 | Srinivasan et al. | |
| 8,554,990 B2 | 10/2013 | Kwon et al. | |
| 9,665,646 B1 | 5/2017 | Belan et al. | |
| 9,912,957 B1 | 3/2018 | Surti et al. | |
| 9,984,090 B1 | 5/2018 | Shang et al. | |
| 10,013,170 B1 * | 7/2018 | Sahin | G06F 3/0631 |
| 10,158,784 B2 | 12/2018 | Dashiell et al. | |
| 10,282,808 B2 | 5/2019 | Seiler et al. | |
| 10,394,453 B1 * | 8/2019 | Bigman | H03M 7/6094 |
| 10,628,391 B1 * | 4/2020 | Bent | G06F 16/2246 |
| 2015/0242309 A1 * | 8/2015 | Talagala | G06F 3/064 |
| | | | 711/103 |
| 2020/0341647 A1 * | 10/2020 | McSweeney | G06F 16/1744 |
| 2021/0036714 A1 * | 2/2021 | Martin | H03M 7/6064 |

* cited by examiner

*Primary Examiner* — Michael Alsip
(74) *Attorney, Agent, or Firm* — Hall Estill Law Firm

(57) ABSTRACT

A system can log data access activity to a memory array with a metadata module while the memory array is logically divided into multiple namespaces. A workload can be determined for each namespace by the metadata module and a metadata strategy can be created with the metadata module in view of the respective namespace workloads. A first metadata and second metadata may be generated for respective first and second user-generated data for storage into a first namespace of the multiple namespaces. The first metadata can be compressed with a compression level prescribed by the metadata strategy in response to a detected or predicted workload to the first namespace before the first metadata, second metadata, first user-generated data, and second user-generated data are each stored in the first namespace.

20 Claims, 9 Drawing Sheets

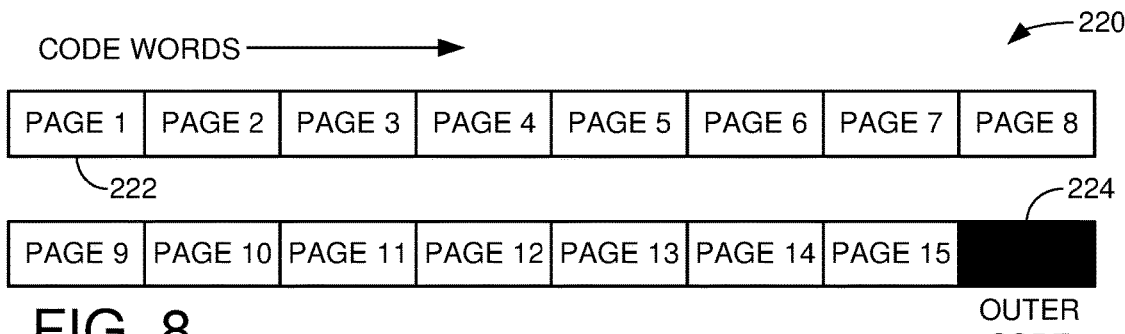
FIG. 8
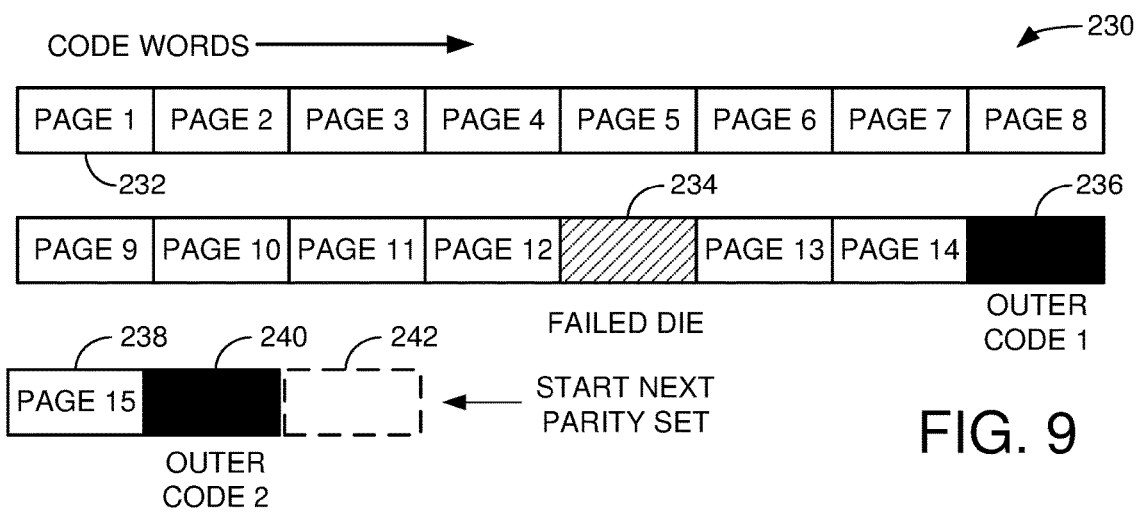
FIG. 9
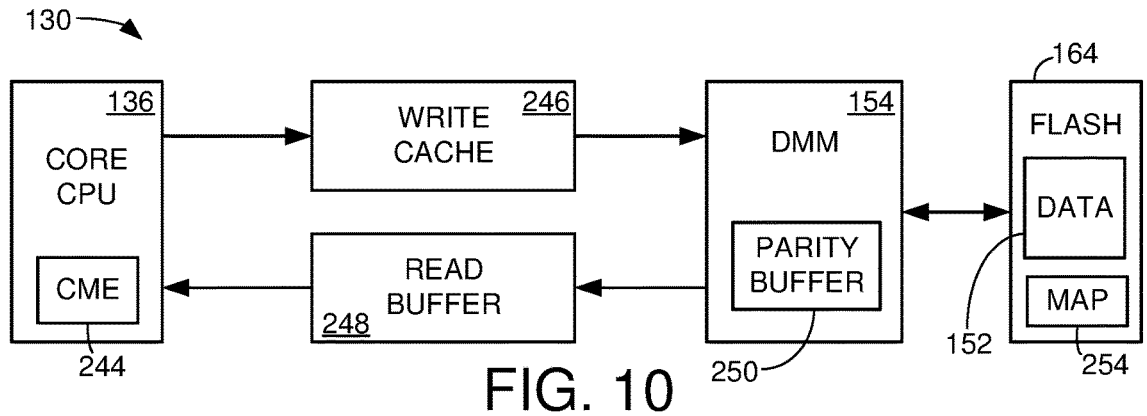
FIG. 10
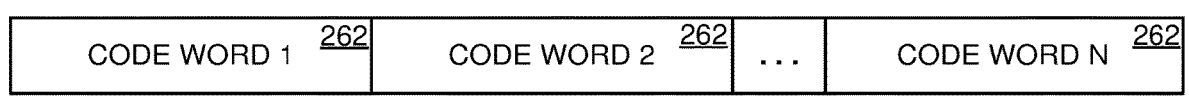
FIG. 11
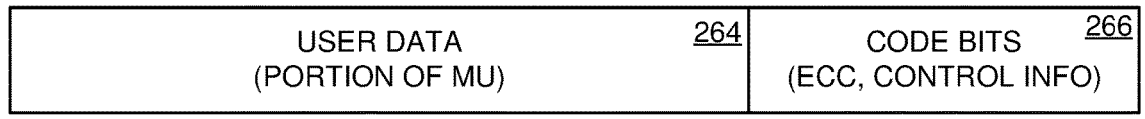

LOSSLESS NAMESPACE METADATA MANAGEMENT SYSTEM

RELATED APPLICATION

The present application makes a claim of domestic priority to U.S. Provisional Patent Application No. 63/198,610 filed Oct. 29, 2020, the contents of which are hereby incorporated by reference.

SUMMARY

Various embodiments of the present disclosure are generally directed to the managing metadata in a memory, such as, but not limited to, a flash memory in a solid state drive (SSD).

In accordance with assorted embodiments of a data system, data access activity to a memory array is logged with a metadata module while the memory array is logically divided into multiple namespaces. A workload is determined for each namespace by the metadata module and a metadata strategy is created with the metadata module in view of the respective namespace workloads. A first metadata and second metadata are generated for respective first and second user-generated data for storage into a first namespace of the multiple namespaces. The first metadata is compressed with a compression level prescribed by the metadata strategy in response to a detected or predicted workload to the first namespace before the first metadata, second metadata, first user-generated data, and second user-generated data are each stored in the first namespace.

BRIEF DESCRIPTION OF THE DRAWINGS

FIG. 8 illustrates an example data set that can be written to the data storage device of FIG. 1 in accordance with assorted embodiments.

FIG. 9 is an example non-standard data set that may occur in the data storage device of FIG. 1 in accordance with various embodiments.

FIG. 10 shows a functional block representation of an example data storage device configured in accordance with some embodiments.

FIG. 11 displays a block representation of portions of an example data storage device arranged in accordance with assorted embodiments.

DETAILED DESCRIPTION

Figure 1:
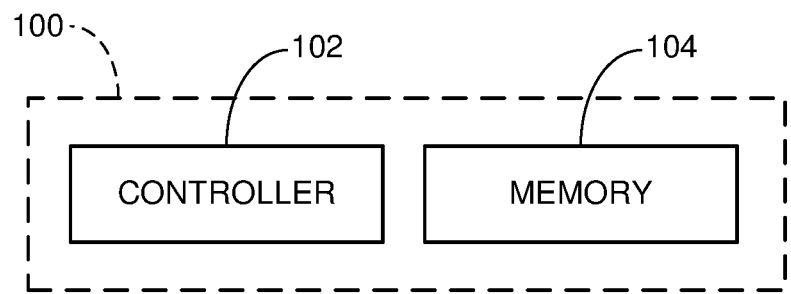
FIG. 1 provides a functional block representation of a data storage device in accordance with various embodiments.

In the assorted embodiments of a system depicted in the present disclosure, logical namespaces are optimized through the intelligent handling of metadata without limitation.

Solid state drives (SSDs) are data storage devices that store user data in non-volatile memory (NVM) made up of an array of solid-state semiconductor memory cells. SSDs usually have an NVM module and a controller. The controller controls the transfer of data between the NVM and a host device. The NVM will usually be NAND flash memory, but other forms of solid-state memory can be used.

A flash memory module may be arranged as a series of dies. A die represents a separate, physical block of semiconductor memory cells. The controller communicates with the dies using a number of channels, or lanes, with each channel connected to a different subset of the dies. Any respective numbers of channels and dies can be used. Groups of dies may be arranged into NVMe sets in accordance with the NVMe (Non-Volatile Memory Express) Standard. This standard enables multiple owners (users) to access and control separate portions of a given SSD (or other memory device).

Metadata is often generated and used to describe and control the data stored to an SSD. The metadata may take the form of one or more map structures that track the locations of data blocks written to various GCUs (garbage collection units), which are sets of erasure blocks that are erased and allocated as a unit. The map structures can include a forward map and a reverse directory, although other forms can be used.

The forward map provides an overall map structure that can be accessed by a controller to service a received host access command (e.g., a write command, a read command, etc.). The forward map may take the form of a two-level map, where a first level of the map maintains the locations of map pages and a second level of the map provides a flash transition layer (FTL) to provide association of logical addresses of the data blocks to physical addresses at which the blocks are stored. Other forms of maps can be used including single level maps and three-or-more level maps, but each generally provides a forward map structure in which pointers may be used to point to each successive block until the most current version is located.

The reverse directory can be written to the various GCUs and provides local data identifying, by logical address, which data blocks are stored in the associated GCU. The reverse directory, also sometimes referred to as a footer, thus provides a physical to logical association for the locally stored blocks. As with the forward map, the reverse directory can take any number of suitable forms. Reverse directories are particularly useful during garbage collection operations, since a reverse directory can be used to determine which data blocks are still current and should be relocated before the associated erasure blocks in the GCU are erased.

SSDs expend a significant amount of resources on maintaining accurate and up-to-date map structures. Nevertheless, it is possible from time to time to have a mismatch between the forward map and the reverse directory for a given GCU. These situations are usually noted at the time of garbage collection. For example, the forward map may indicate that there are X valid data blocks in a given erasure block (EB), but the reverse directory identifies a different number Y valid blocks in the EB. When this type of mismatch occurs, the garbage collection operation may be rescheduled or may take a longer period of time to complete while the system obtains a correct count before proceeding with the recycling operation.

The NVMe specification provides that a storage device should have the ability to provide guaranteed levels of deterministic performance for specified periods of time (deterministic windows, or DWs). To the extent that a garbage collection operation is scheduled during a DW, it is desirable to ensure that the actual time that the garbage collection operation would require to complete is an accurate estimate in order for the system to decide whether and when to carry out the GC operation.

SSDs include a top level controller circuit and a flash (or other semiconductor) memory module. A number of channels, or lanes, are provided to enable communications between the controller and dies within the flash memory. The dies are further subdivided into planes, GCUs, erasure blocks, pages, etc. Groups of dies may be arranged into separate NVMe sets, or namespaces. This allows the various NVMe sets to be concurrently serviced for different owners (users).

In one nonlimiting example, a 4 TB SSD has 128 die connected using 8 channels so that 16 die are connected to each channel. Each die has two planes that support concurrent read or write operations to the same page number (but not necessarily the same erasure blocks, EBs). GCUs nominally are formed using one EB from each of 32 dies. Each page stores 16K of data plus LDPC inner code values. GCU writes are thus formed by writing (nominally) 31 pages of user data, and one page of parity (XOR) data. This will support a loss of a single die. EBs represent the smallest increment of memory that can be erased as a unit, but in practice, garbage collection takes place at the GCU level.

Flash devices can be noisy and thus it is common to write data in the form of code words to individual pages of data. A page may store 16K worth of user payload data, plus some additional number of LDPC (low density parity check) codes, which may be on the order of an additional 5K or so bits. The number and strength of the LDPC codes are used to enable, normally, correct reading back of the payload. Outercode, or parity values, can additionally be written as noted above to correct read errors when the inner code values are insufficient to resolve the error.

Despite the ability to correct errors, the efficient utilization of memory in a solid-state data storage device remains important. With some solid-state memories having a finite lifespan tied to a number of read, write, and erase cycles, such as flash memory, the efficient utilization of memory cells is even more important. The logical division of memory into namespaces has allows object storage that is less rigid than physical division of memory, such as by device, die, plane, page, block, or range of physical block addresses (PBA). The use of namespaces can allow for increased controller customization of where data can be stored, and retrieved. However, simple logical namespaces can generate increased volumes of system processing that can degrade data storage performance.

The evolution of logical memory namespaces has progressed to having zoned namespaces where portions of memory are associated with sequential data writing and collaboration of local memory and host controller for data placement. The use of zoned namespaces can increase data storage efficiency by reducing write amplification, data over-provisioning, and volatile data buffer space consumed during the storage, and retrieval, of data in a memory. Zoned namespaces can be customized to provide increased write performance through streams, but existing zoned namespace configurations and utilizations often suffer from inconsistency and unreliability, particularly when relatively large volumes of metadata are created and stored in solid-state memory that employ multiple physically separate die of memory cells facing increasing pressure for consistent data access performance for data writes and data reads.

With these issues in mind, assorted embodiments of a data system utilize a metadata module to intelligently handle metadata without degrading system data access performance. The ability to execute predetermined actions in response to workloads to logical namespaces of at least one memory allow for dynamic handling of metadata that results in the establishment, and maintenance, of data access performance over time. Accordingly, embodiments of a metadata module can customize how metadata is handled. The metadata module can intelligently detect workloads and execute one or more reactive, and/or proactive, metadata policy changes that adjust for variances in memory cell structural operation, channel function, and pending data access requests to maintain data access performance and minimal processing overhead despite evolving namespace workloads. Hence, the customization of metadata policy for a namespace in response to actual detected namespace workloads ensure that system resources, such as processing, channel, and buffers, are utilized intelligently to provide reliable quality of service and predetermined data access performance.

These and other features may be practiced in a variety of different data storage devices, but various embodiments conduct wear range optimization in the example data storage device 100 shown as a simplified block representation in FIG. 1. The device 100 has a controller 102 and a memory module 104. The controller block 102 represents a hardware-based and/or programmable processor-based circuit configured to provide top level communication and control functions. The memory module 104 includes solid state non-volatile memory (NVM) for the storage of user data from one or more host devices 106, such as other data storage devices, network server, network node, or remote controller.

Figure 2:
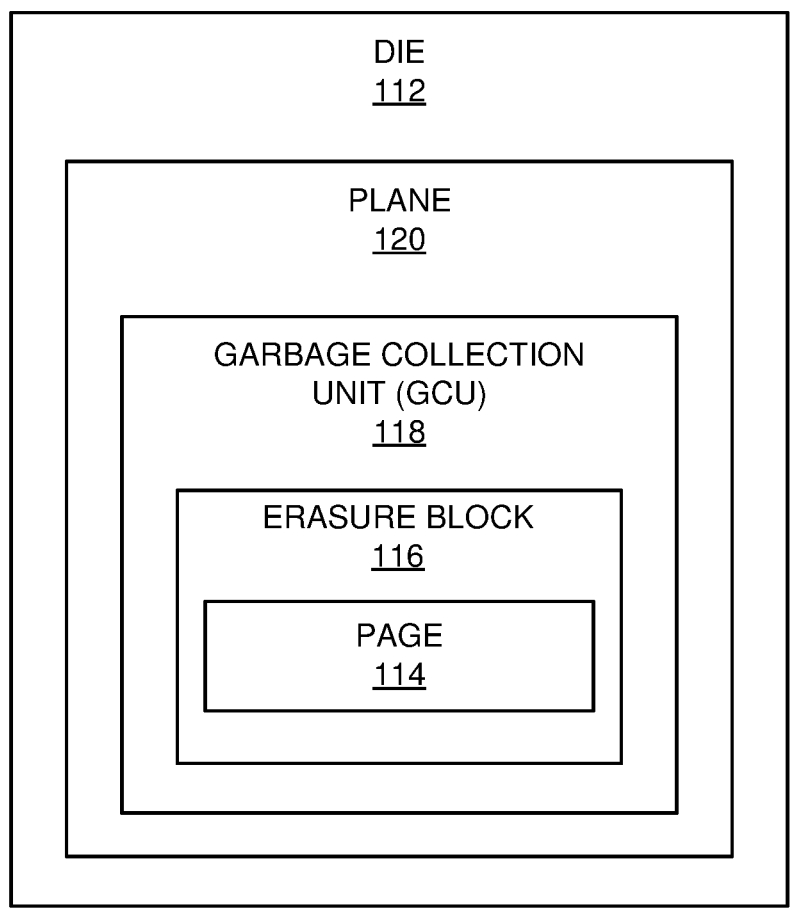
FIG. 2 shows aspects of the device of FIG. 1 characterized as a solid state drive (SSD) in accordance with some embodiments.

FIG. 2 shows a block representation of portions of an example memory 110 arranged in accordance with some embodiments. A memory die 112 can be configured with any solid-state memory cells, such as flash, resistive, phase change, and spin-torque memory, without limitation. The smallest unit of memory that can be accessed at a time is referred to as a page 114. A page 114 may be formed using a number of solid-state memory cells that share a common word line, bit line, or source line. The storage size of a page 114 can vary; current generation flash memory pages can store, in some cases, 16 KB (16,384 bytes) of user data.

A number of pages are integrated into an erasure block 116, which represents the smallest grouping of memory cells that can be concurrently erased in a NAND flash memory. A number of erasure blocks 116 can be arranged into a garbage collection unit (GCU) 118, which may utilize erasure blocks across different dies 112, as explained below. GCUs 118 can be allocated for the storage of data. Once a sufficient amount of the stored data is determined to be stale (e.g., no longer the most current version), a garbage collection operation can be carried out to recycle the GCU 118. This includes identifying and relocating the current version data to a new location, followed by an erasure operation to reset the memory cells. The GCU 118 may then be returned to an allocation pool for subsequent allocation to begin storing new user data.

Each die 112 may include a plurality of planes 120. Examples include two planes per die, four planes per die, etc. although other arrangements can be used. Generally, a plane is a subdivision of the die 112 arranged with separate read/write/erase circuitry such that a given type of access operation (such as a write operation, etc.) can be carried out simultaneously by each of the planes to a common page address within the respective planes.

Figure 3:
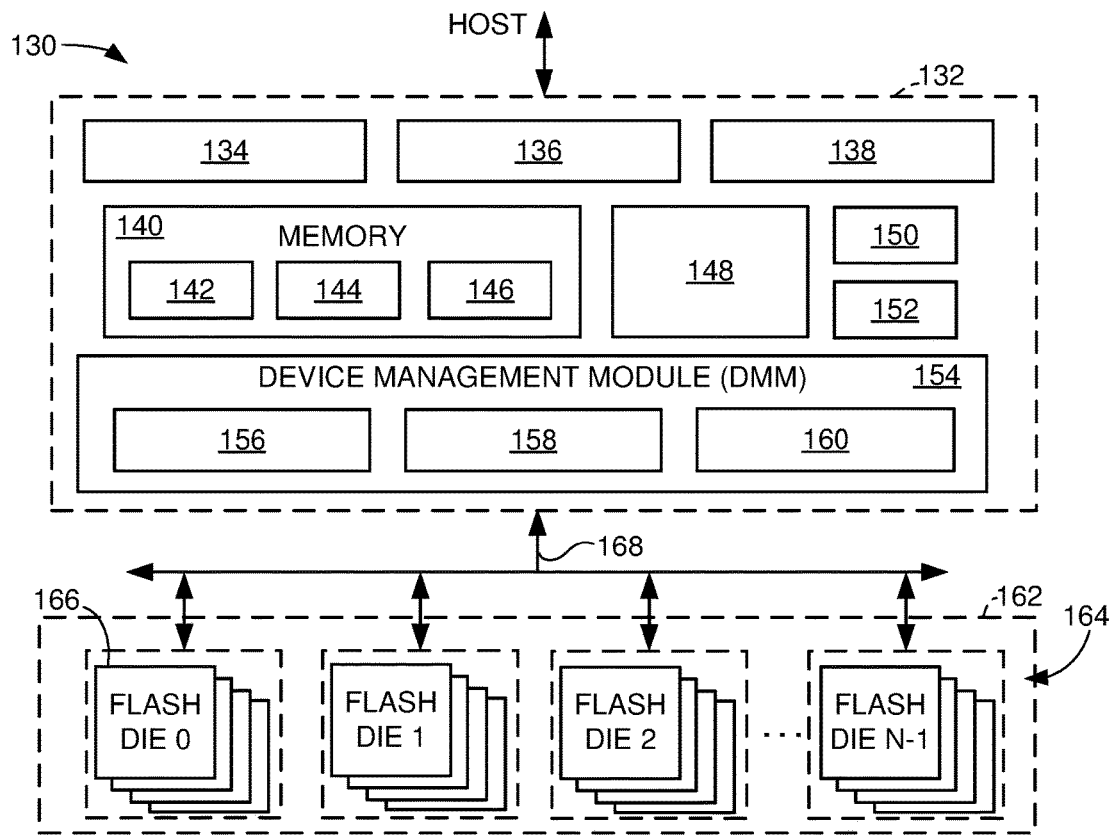
FIG. 3 shows an arrangement of the flash memory of FIG. 2 in some embodiments.

FIG. 3 depicts portions of an example data storage device 130 generally corresponding to the device 100 in FIG. 1. The device 130 is configured as a solid state drive (SSD) that communicates with one or more host devices via one or more Peripheral Component Interface Express (PCIe) ports, although other configurations can be used. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate NVMe sets (die sets) for use in the storage of data, Each NVMe set may form a portion of an NVMe Namespace that may span multiple SSDs or be contained within a single SSD.

The SSD 130 includes a controller circuit 132 with a front end controller 134, a core controller 136 and a back end controller 138. The front end controller 134 performs host I/F functions, the back end controller 138 directs data transfers with the memory module 134 and the core controller 136 provides top level control for the device.

Each controller 134, 136 and 138 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 140 represents various forms of volatile and/or non-volatile memory (e.g., SRAM, DDR DRAM, flash, etc.) utilized as local memory by the controller 132. Various data structures and data sets may be stored by the memory including one or more map structures 142, one or more caches 144 for map data and other control information, and one or more data buffers 146 for the temporary storage of host (user) data during data transfers.

A non-processor based hardware assist circuit 148 may enable the offloading of certain memory management tasks by one or more of the controllers as required. The hardware circuit 148 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 132, such as a data compression block 150 and an encryption block 152. The data compression block 150 applies lossless data compression to input data sets during write operations, and subsequently provides data de-compression during read operations. The encryption block 152 provides any number of cryptographic functions to input data including encryption, hashes, decompression, etc.

A device management module (DMM) 154 supports back end processing operations and may include an outer code engine circuit 156 to generate outer code, a device I/F logic circuit 158 and a low density parity check (LDPC) circuit 160 configured to generate LDPC codes as part of the error detection and correction strategy used to protect the data stored by the by the SSD 130.

A memory module 162 corresponds to the memory 104 in FIG. 1 and includes a non-volatile memory (NVM) in the form of a flash memory 164 distributed across a plural number N of flash memory dies 166. Rudimentary flash memory control electronics (not separately shown in FIG. 3) may be provisioned on each die 166 to facilitate parallel data transfer operations via one or more channels (lanes) 168.

Figure 4:
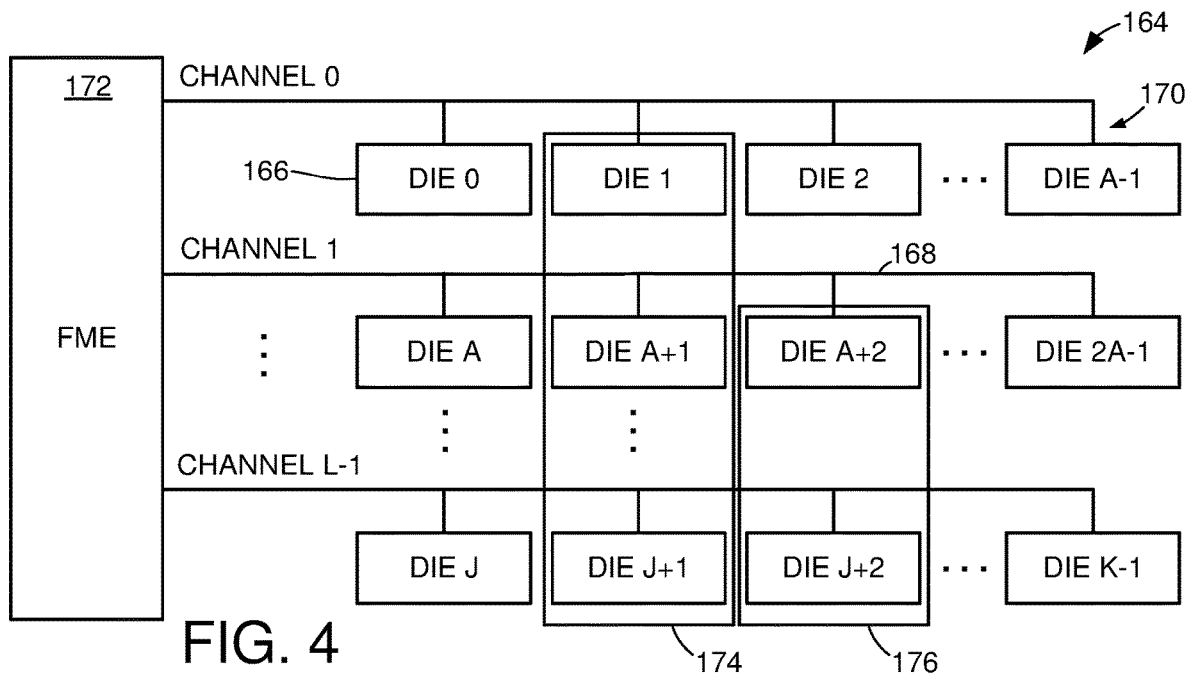
FIG. 4 illustrates the use of channels to access the dies in FIG. 3 in some embodiments.

FIG. 4 shows further aspects of the flash memory 164 arranged in accordance with some embodiments. A total number K dies 166 are provided and arranged into physical die groups 170. Each die group 170 is connected to a separate channel 168 using a total number of L channels. In one example, K is set to 128 dies, L is set to 8 channels, and each physical die group has 16 dies. As noted above, a single die within each physical die group can be accessed at a time using the associated channel. A flash memory electronics (FME) circuit 172 of the flash memory 164 controls each of the channels 168 to transfer data to and from the dies 166.

In some embodiments, the various dies are arranged into one or more NVMe sets. An NVMe set represents a portion of the storage capacity of the SSD that is allocated for use by a particular host (user/owner). NVMe sets are usually established with a granularity at the die level, so that some percentage of the total available dies 166 will be allocated for incorporation into a given NVMe set.

A first example NVMe set is denoted at 174 in FIG. 4. This first set 174 uses a single die 166 from each of the different channels 168. This arrangement provides fast performance during the servicing of data transfer commands for the set since all eight channels 168 are used to transfer the associated data. A limitation with this approach is that if the set 174 is being serviced, no other NVMe sets can be serviced during that time interval. While the set 174 only uses a single die from each channel, the set could also be configured to use multiple dies from each channel, such as 16 dies/channel, 32 dies/channel, etc.

A second example NVMe set is denoted at 176 in FIG. 4. This set uses dies 166 from less than all of the available channels 168. This arrangement provides relatively slower overall performance during data transfers as compared to the set 174, since for a given size of data transfer, the data will be transferred using fewer channels. However, this arrangement advantageously allows the SSD to service multiple NVMe sets at the same time, provided the sets do not share the same (e.g., an overlapping) channel 168.

Figure 5:
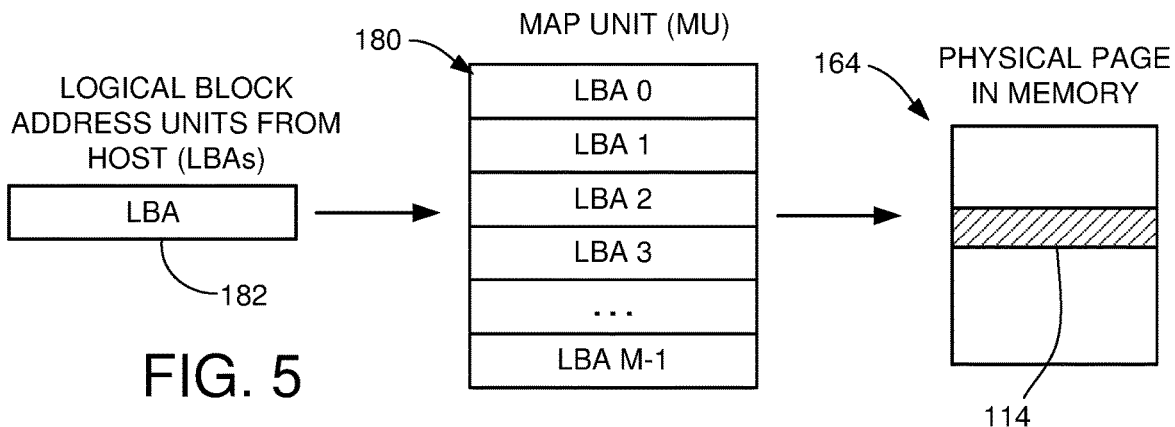
FIG. 5 illustrates a map unit (MU) as a data arrangement stored to the flash memory of FIG. 2.

FIG. 5 illustrates a manner in which data may be stored to a flash memory 164. Map units (MUs) 180 represent fixed sized blocks of data that are made up of one or more user logical block address units (LBAs) 182 supplied by the host. Without limitation, the LBAs 182 may have a first nominal size, such as 512 bytes (B), 1024B (1 KB), etc., and the MUs 180 may have a second nominal size, such as 4096B (4 KB), etc. The application of data compression may cause each MU to have a smaller size in terms of actual bits written to the flash memory 164.

The MUs 180 are arranged into the aforementioned pages 114 (FIG. 2) which are written to the memory 164. In the present example, using an MU size of 4 KB, then nominally four (4) MUs may be written to each page. Other configurations can be used. To enhance data density, multiple pages worth of data may be written to the same flash memory cells connected to a common control line (e.g., word line) using multi-bit writing techniques; MLCs (multi-level cells) write two bits per cell, TLCs (three-level cells) write three bits per cell; XLCs (four level cells) write four bits per cell, etc.

Data stored by an SSD are often managed using metadata. The metadata provide map structures to track the locations of various data blocks (e.g., MUAs 180) to enable the SSD 130 to locate the physical location of existing data. For example, during the servicing of a read command it is generally necessary to locate the physical address within the flash memory 166 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
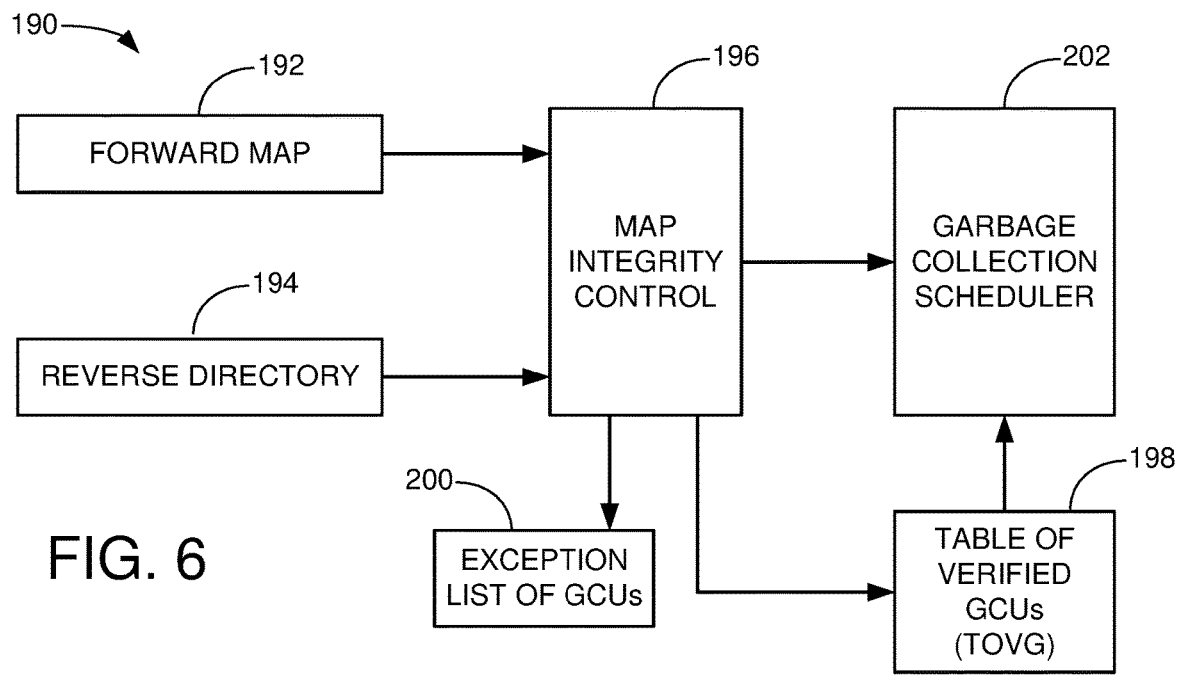
FIG. 6 displays a functional block diagram for a GCU management circuit of the SSD in accordance with some embodiments.

FIG. 6 shows a functional block diagram for a GCU management circuit 190 of the SSD 130 in accordance with some embodiments. The circuit 190 may form a portion of the controller 132 and may be realized using hardware circuitry and/or one or more programmable processor circuits with associated firmware in memory. The circuit 190 includes the use of a forward map 192 and a reverse directory 194. As noted above, the forward map and reverse directory are metadata data structures that describe the locations of the data blocks in the flash memory 164. During the servicing of host data transfer operations, as well as other operations, the respective portions of these data structures are located in the flash memory or other non-volatile memory location and copied to local memory 140 (see e.g., FIG. 3).

The forward map 192 provides a flash transition layer (FTL) to generally provide a correlation between the logical addresses of various blocks (e.g., MUAs) and the physical addresses at which the various blocks are stored (e.g., NVMe set, die, plane, GCU, EB, page, bit offset, etc.). The contents of the forward map 192 may be stored in specially configured and designated GCUs in each NVMe set.

The reverse directory 194 provides a physical address to logical address correlation. The reverse directory contents may be written as part of the data writing process to each GCU, such as in the form of a header or footer along with the data being written. Generally, the reverse directory provides an updated indication of how many of the data blocks (e.g., MUAs) are valid (e.g., represent the most current version of the associated data).

The circuit 190 further includes a map integrity control circuit 196. As explained below, this control circuit 196 generally operates at selected times to recall and compare, for a given GCU, the forward map data and the reverse directory data. This evaluation step includes processing to determine if both metadata structures indicate the same number and identify of the valid data blocks in the GCU.

If the respective forward map and reverse directory match, the GCU is added to a list of verified GCUs in a data structure referred to as a table of verified GCUs, or TOVG 198. The table can take any suitable form and can include a number of entries, with one entry for each GCU. Each entry can list the GCU as well as other suitable and useful information, such as but not limited to a time stamp at which the evaluation took place, the total number of valid data blocks that were determined to be present at the time of validation, a listing of the actual valid blocks, etc.

Should the control circuit 196 find a mismatch between the forward map 192 and the reverse directory 194 for a given GCU, the control circuit 196 can further operate to perform a detailed evaluation to correct the mismatch. This may include replaying other journals or other data structures to trace the history of those data blocks found to be mismatched. The level of evaluation required will depend on the extent of the mismatch between the respective metadata structures.

For example, if the forward map 192 indicates that there should be some number X valid blocks in the selected GCU, such as 12 valid blocks, but the reverse directory 194 indicates that there are only Y valid blocks, such as 11 valid blocks, and the 11 valid blocks indicated by the reverse directory 194 are indicated as valid by the forward map, then the focus can be upon the remaining one block that is valid according to the forward map but invalid according to the reverse directory. Other mismatch scenarios are envisioned.

The mismatches can arise due to a variety of factors such as incomplete writes, unexpected power surges or disruptions that prevent a full writing of the state of the system, etc. Regardless, the control circuit can expend the resources as available to proactively update the metadata. In some embodiments, an exception list 200 may be formed as a data structure in memory of GCUs that have been found to require further evaluation. In this way, the GCUs can be evaluated later at an appropriate time for resolution, after which the corrected GCUs can be placed on the verified list in the TOVG 198.

It will be noted that the foregoing operation of the control circuit 196 in evaluating GCUs does not take place once a garbage collection operation has been scheduled; instead, this is a proactive operation that is carried out prior to the scheduling of a garbage collection operation. In some cases, GCUs that are approaching the time at which a garbage collection operation may be suitable, such as after the GCU has been filled with data and/or has reached a certain aging limit, etc., may be selected for evaluation on the basis that it can be expected that a garbage collection operation may be necessary in the relatively near future.

FIG. 6 further shows the GCU management circuit 190 to include a garbage collection scheduler circuit 202. This circuit 202 generally operates once it is appropriate to consider performing a garbage collection operation, at which point the circuit 202 selects from among the available verified GCUs from the table 198. In some cases, the circuit 202 may generate a time of completion estimate to complete the garbage collection operation based on the size of the GCU, the amount of data to be relocated, etc.

As will be appreciated, a garbage collection operation can include accessing the forward map and/or reverse directory 192, 194 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 7:
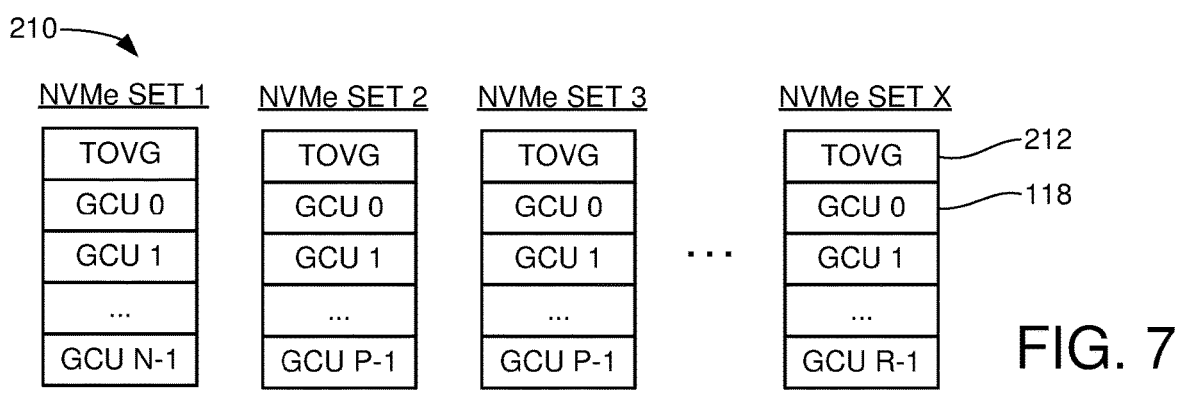
FIG. 7 represents an arrangement of various GCUs and corresponding tables of verified GCUs (TOVGs) for a number of different NVMe sets in some embodiments.

FIG. 7 shows a number of NVMe sets 210 that may be arranged across the SSD 130 in some embodiments. Each set 210 may have the same nominal data storage capacity (e.g., the same number of allocated dies, etc.), or each may have a different storage capacity. The storage capacity of each NVMe set 210 is arranged into a number of GCUs 118 as shown. In addition, a separate TOVG (table of verified GCUs) 212 may be maintained by and in each NVMe set 210 to show the status of the respective GCUs. From this, each time that it becomes desirable to schedule a garbage collection operation, such as to free up new available memory for a given set, the table 212 can be consulted to select a GCU that, with a high degree of probability, can be subjected to an efficient garbage collection operation without any unexpected delays due to mismatches in the metadata (forward map and reverse directory).

FIG. 8 illustrates a manner in which a parity data set 220 can be written to a selected GCU 118 in the flash memory 164 in accordance with some embodiments. In this example, it is contemplated that the selected GCU 118 is formed from sixteen (16) erasure blocks 116, with each of the erasure blocks disposed on a different die 166. Other sizes can be used as desired.

In FIG. 8, the parity data set has fifteen (15) user data pages 222, with each user data page, or payload, written to a different one of the dies. More generally, the GCU has N erasure blocks on a corresponding N dies, and payloads 222 are written to N−1 of the dies. The Nth die receives an outer code (parity value), which is represented at 224. As mentioned above, the outer code may be generated by summing the page data in a buffer using an XOR function. Because the parity data set 220 has data boundaries that nominally match the GCU boundaries, the parity data set in FIG. 8 is referred to as a standard parity data set since the data matches the available memory.

FIG. 9 shows an example non-standard parity data set 230. The parity data set 230 is the same size as the parity data set 220 in FIG. 8 in that, as before, the parity data set 230 has a total of fifteen (15) pages/payloads 232. However, one of the dies 166 has experienced a failure, as indicated at 234, so that the GCU only spans 15 dies.

Accordingly, the controller circuit 132 (FIG. 3) operates to write a full set of the available pages, which in this case is Page 1 to Page 14, through the available dies. This is followed by the writing of a first outer code (parity value) in the Nth location, as shown at 236, which protects the payloads (Page 1 to Page 14) written during this first pass through the available dies.

A leftover payload 238 (Page 15) is written to the next available page in the first die (such as adjacent Page 1). This leftover payload is referred to as a runt or runt data, and represents the remainder after an integer number of passes have been made through the available dies. Once all of the leftover payloads have been written, a second outer code (parity value) is written in the next available die, as shown at 240. This second outer code is disposed in the same die as, and is adjacent to, the Page 2 payload.

In this way, when leftover (runt) payload sets remain, these are written to as many additional dies as are required, followed by the writing of a final parity value to cover the runts. Map data may be generated to note the non-standard outer code arrangement. This provides a parity data set with a parity value to protect each pass through the dies, plus another parity value to cover the remainder.

While FIG. 9 shows the non-standard parity data set has arisen due to a non-standard sized available memory (e.g., due to the die failure at 234), other non-standard parity data sets can arise based on other factors. For example, a particular data set to be written to a given NVMe set may make up a total number of MUs that do not align with the GCU boundaries. In another case, data compression or other processing may result in a non-standard sized parity data set. It will be appreciated that if a given GCU has N dies, then a non-standard sized data set will have a total number M payloads (or portions thereof) that are not divisible by N without a remainder. The remainder could be any value from one extra payload up to N−1 extra payloads. Regardless, each pass through the dies will be parity protected, irrespective of the overall length of the parity data set.

Once a non-standard parity set is written, map data may be generated and stored to indicate the fact that the parity data set is of non-standard length. Information may be stored in the map data such as how much longer the data set is in terms of additional pages in the remainder, the location of the last parity value (e.g., 240), etc. To maximize data density, the controller may operate to initiate the writing of the next parity data set at the next available page on the next die in the sequence, as shown at 242 in FIG. 9.

FIG. 10 shows a functional block representation of additional aspects of the SSD 130. The core CPU 136 from FIG. 3 is shown in conjunction with a code management engine (CME) 244 that can be used to manage the generation of the respective code words and outer code parity values for both standard and non-standard parity data sets During write operations, input write data from the associated host are received and processed to form MUs 180 (FIG. 5) which are placed into a non-volatile write cache 246 which may be flash memory or other form(s) of non-volatile memory. The MUs are transferred to the DMM circuit 154 for writing to the flash memory 164 in the form of code words that contain user data, inner code, and outer code. During read operations, one or more pages of data are retrieved to a volatile read buffer 248 for processing prior to transfer to the host.

The CME 244 determines the appropriate inner and outer code rates for the data generated and stored to memory. In some embodiments, the DMM circuit 154 may generate both the inner and outer codes. In other embodiments, the DMM circuit 154 generates the inner codes (see e.g., LDPC circuit 160 in FIG. 3) and the core CPU 136 generates the outer code words. In still other embodiments, the same processor/controller circuit generates both forms of code words. Other arrangements can be used as well. The CME 244 establishes appropriate code rates for both types of code words.

During generation of the outer codes, a parity buffer 250 may be used to successively XOR each payload being written during each pass through the dies. Both payload data 252 and map data 254 will be stored to data locations in flash 164.

FIG. 11 is a block representation of portions of an example data storage device 260 in which data is arranged into a plurality of code words 262 that can efficiently be stored, and retrieved, from one or more SSD storage destinations. A page 150 of data may comprise a number of consecutive, or non-consecutive, code words 262 organized to effectively fit in the available space of an SSD.

As shown, a code word 262 can consist of user data 264 and inner code 266 generated to complement the user data 264, such as by the LDPC circuitry 138. The inner code 266 can provide a diverse variety of capabilities, such as error correction via error correction code (ECC), data status, data offset, and other data control information. The combination of user data 264 and inner code 266 together in a code word 262 allows for efficient analysis, verification, and correction (if necessary) of errors in reading, or writing, the user data 264 to/from memory. However, the inner code 266 may be insufficient, in some cases, to overcome and/or correct errors associated with storage of the code word 262. Hence, various embodiments generate outer code that provides higher-level data analysis and correction in complementary fashion to the inner code 266.

Figure 12:
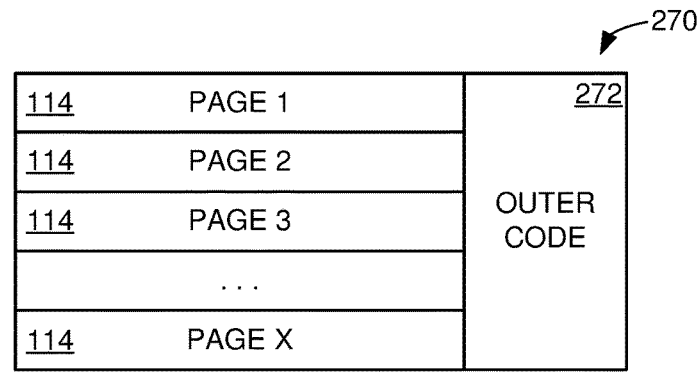
FIG. 12 shows a block representation of portions of an example data storage device configured in accordance with various embodiments.

FIG. 12 conveys a block representation of a portion of an example data storage device 270 where pages 150 of code words 262 are stored in combination with outer code 272 in accordance with some embodiments. The outer code 272 may be associated with one or more pages 150 of code words to provide data that describes the constituent code words 262 and allows for verification and correction of the accuracy, and reliability, of the user data of the respective code words 262.

It is contemplated that the outer code 272 can operate to correct errors and faults that occur during the reading, or writing, of the code words 262. Such corrective function of outer code 272 allows user data to be retrieved despite encountered errors/faults that were uncorrectable by inner code 266. In some embodiments, a probation counter for the user data and/or the physical address of memory where the user data 264 is stored is maintained in the inner code 266, outer code 272, or elsewhere in memory to allow a physical address and/or user data to be monitored in real-time with simple polling of the probation counter.

The ability to correct and recover from encountered error during data access operations to a memory provides additional longevity and reliability for a memory and the data stored therein. However, this ability comes at a relatively high system resource price as processing, storage capacity, and time are expended to correct errors and recover data. The use of such system resources can jeopardize the data storage and retrieval performance for some, or all, of a distributed data storage system. Regardless of the sophistication, efficiency, or accuracy of error/failure recovery in a data storage device, the inefficient retrieval of stored data can jeopardize the performance of a data storage device as well as reduce the operational lifespan of the memory constituent in the device.

Figure 13:
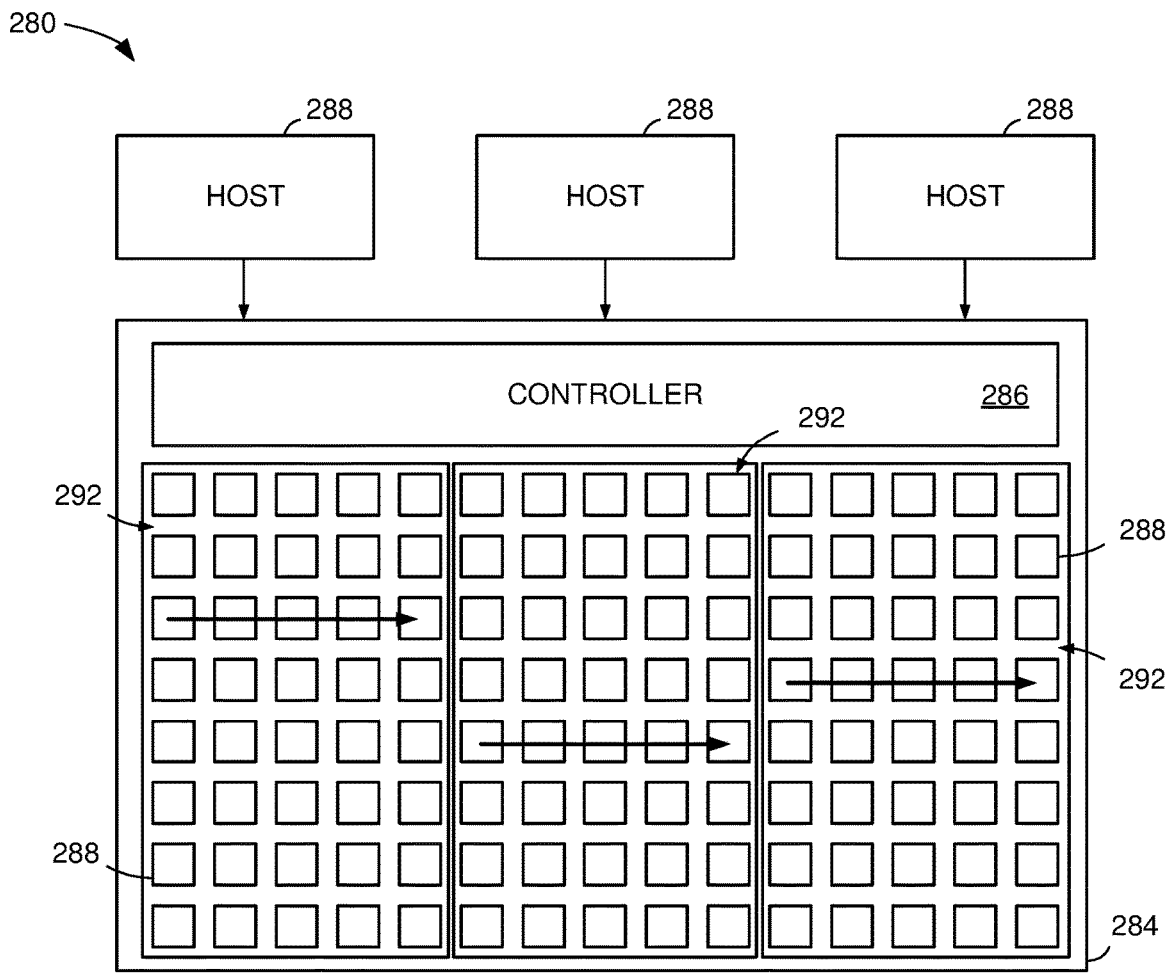
FIG. 13 depicts a block representation of portions of example system in which assorted embodiments can be practiced.

FIG. 13 depicts portions of an example data system 280 arranged and utilized in accordance with assorted embodiments. The system 280 shows how multiple separate hosts 282 are connected to a data storage device 284 that employs a local drive controller 286 to direct data accesses in one or more memory cells 288. It is noted that the data storage system 280 can employ any number of hosts 282 connected to one or more data storage devices 284 via any number of wired and/or wireless connections.

The drive controller 286 can organize the assorted memory cells 288 into various logical namespaces 290 that can span any physical memory cell configuration, such as one or more platters, die, planes, or pages. The various namespaces 290 can provide selective writing of data, which can be utilized for dedicated streaming of data from one or more hosts, wear-leveling of data across amongst available memory cells 288, and reduced data access latency in some situations. However, the generation and maintenance of namespaces 290 can increase write amplification and mapping cache needs in addition to greater volumes of over-provisioning space.

Thus, namespaces 290 can be arranged in zones, as shown, that involve protocol to sequentially write data from the beginning data block address of each zone 290 without the ability to overwrite or erase anything but an entire zone 290, as illustrated by arrows. The logical zoned namespaces 290 provide the ability to allow a host 282 direct access to portions of memory, which can reduce latency while increasing data throughput and cost efficiency. Compared to non-zoned namespaces, zoned namespaces 290 allow for separate host workloads with less over-provisioning and write amplification. Yet, the treatment of a zoned namespace 290 as a collective data unit that must be sequentially written and only erased as a whole increases front-end processing and buffer space for data accesses, mapping, and organization.

The logical organization of memory cells 288 into namespaces 290, particularly zoned namespaces 290, can create processing and implementation difficulties when the namespace 290 spans physical block addresses of cells 288 located in separate locations, such as different data storage devices or die of a single data storage device. For instance, the erasing of the entirety of a zoned namespace 290 spanning separate physical block addresses can involve different channels, memory cell 288 maintenance operations, and delays compared to a namespace 290 located in a single physical memory, such as a single die or plane of cells 288.

Figure 14:
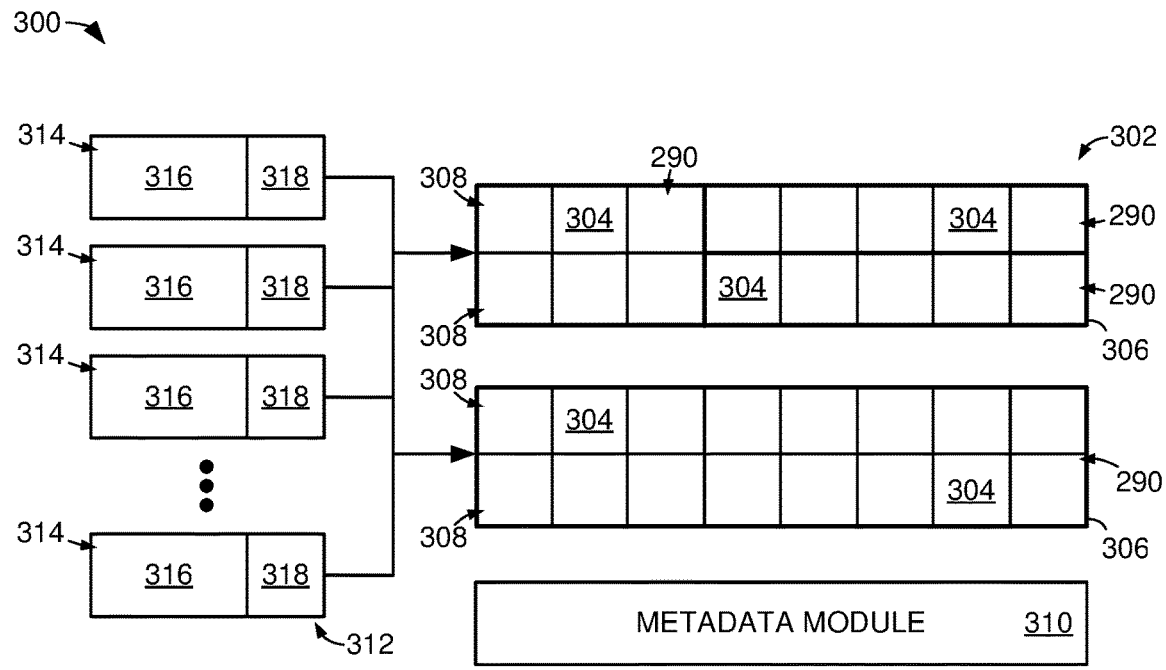
FIG. 14 depicts a block representation of portions of an example system operated in accordance with some embodiments.

Portions of an example data system 300 are shown with block representations in FIG. 14. The system 300 can be utilized, in accordance with some embodiments, with one or more memories 302 comprising multiple solid-state memory cells 304 that are physically divided into die 306 and planes 308 while being logically divided into zoned namespaces 290 by a local controller in combination with a metadata module 308. One or more queues 310 can temporarily hold data access requests, such as data reads, garbage collection operations, and data writes, that are pending for one or more namespaces, logical data block addresses, and physical data block addresses.

In the non-limiting queue 312, a plurality of data writes requests 314 are pending to be stored in at least one namespace 290 with each request 314 comprising a host-generated payload 316 and corresponding metadata 318. With greater volumes of data write requests being serviced, the system 300 concurrently handles payload 316 and metadata 318 storage, which can be with similar or dissimilar handling policies. For instance, the payload 316 may have different security, compression, and destination addresses in a namespace 290 compared to the corresponding metadata. The fact that metadata 318 simply describes the payload 316 prioritizes the efficient and reliable storage of the payload 316 over metadata 318 due to metadata 318 being more easily recreated compared to a payload 316.

The presence of relatively large volumes of metadata 318 can prompt the execution of one or more actions to mitigate data access performance degradation, such as compressing the metadata to a greater degree than payloads 316 to shrink the memory footprint. However, the mechanism of compression, and subsequent decompression, results in greater numbers of metadata maps and/or journals to track the location of the metadata 318 and allow for use if and when a corresponding payload 316 is read to satisfy a user-generated data read request. Hence, compression can reduce the size of metadata, but may not improve the processing, power, and time resources expended to accurately maintain the metadata for the data system 300.

Figure 15:
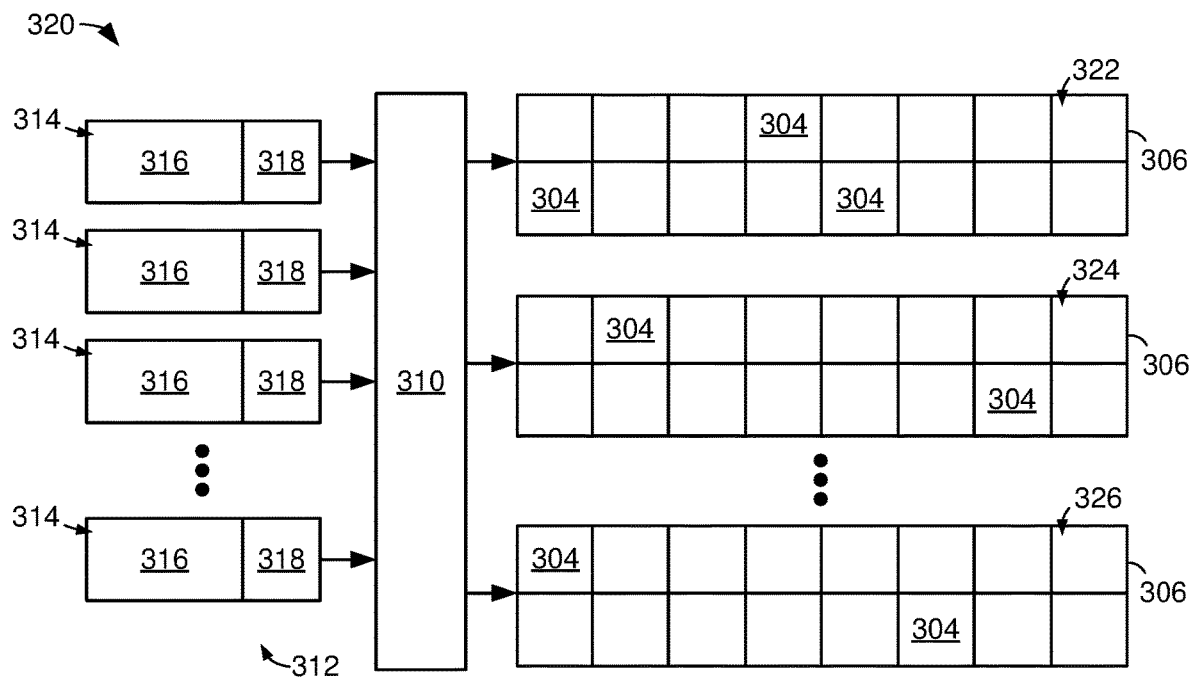
FIG. 15 depicts a block representation of portions of an example system configured and utilized in accordance with various embodiments.

FIG. 15 depicts a block representation of portions of an example data system 320 configured to deploy assorted embodiments to provide customized, workload-based handling of metadata. As shown, the queue 312 of data write requests are intercepted by the metadata module 310 before reaching a destination logical block address of a zoned namespace located in one or more planes 306 of memory cells 304. The metadata module 310 can execute at least one metadata handling strategy that can optimize the metadata 318 itself and/or how the metadata 318 is handled prior to being written to the destination zoned namespace.

By adapting how metadata is generated, processed, and/or stored with a predetermined metadata handling strategy, the metadata module 310 can provide optimal data access performance for the data system 320 despite varying namespace workloads. The ability to alter a metadata operational policy with the metadata module 310 provides an intelligent balance of processing and time resources employed during system 320 operation with metadata 318 usage that efficiently describes user-generated payloads 316. The existence of strategies to handle metadata provides intelligent reactions, and proactive actions, that can efficiently be implemented quickly to mitigate the degradation of data access performance for a namespace due to metadata generation, processing, or use.

Figure 16:
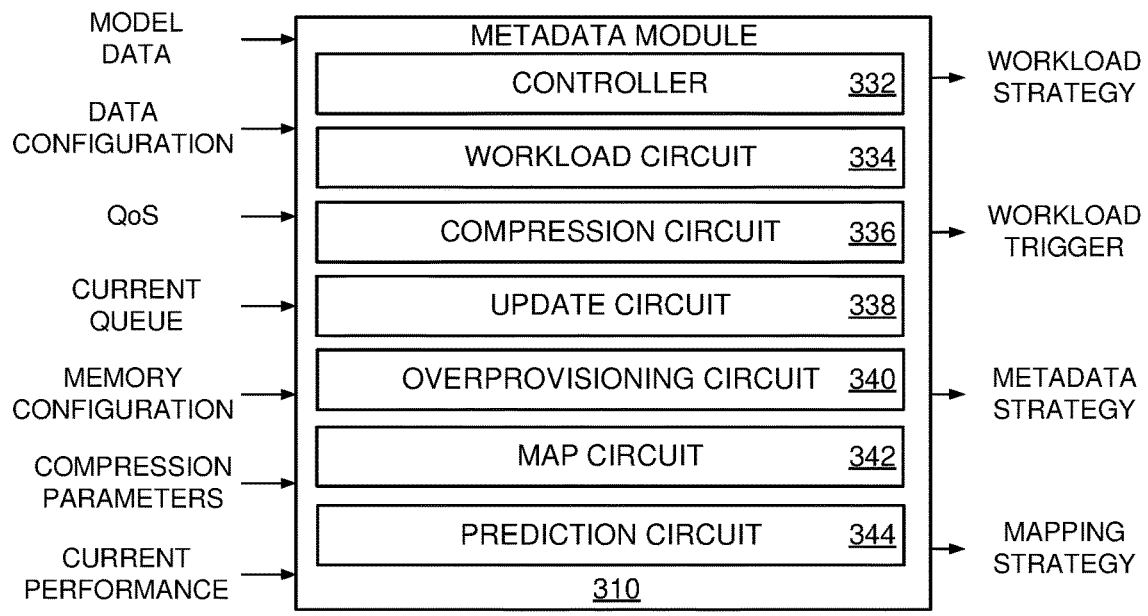
FIG. 16 depicts a block representation of an example metadata module that can be employed in assorted embodiments of a system.

FIG. 16 depicts a block representation of an example metadata module 310 that can be employed in a data system in accordance with assorted embodiments. The module 310 can utilize one or more controllers 332 to translate a variety of input information into at least a workload detection strategy, a workload trigger, a metadata strategy, and a mapping strategy that can be selectively, and concurrently, conducted to provide namespace optimization in view of metadata and data access workloads. The module controller 332 may be a standalone circuit, such as a microprocessor or other programmable circuitry, resident anywhere in a data system, such as in a standalone node, network node, host, or data storage device.

Regardless of where a controller 332, and module 310, is located in a data system, the data access activity to one or more memories can be monitored and logged along with the current memory configuration, security protocol, quality of service criteria, and data locations. The module controller 332 can input past logged information, such as error rate, data access latency, location of stale data, and garbage collection activity. While current and past information about the data system in which the module 310 is resident can be procured, the controller 332 may additionally refer to one or more data models pertaining to other data storage systems, memories, or host access activity.

While not limiting, the namespace module 310 can input assorted current and past logged conditions for one or more memories of a data storage system. For instance, the current physical block addresses of various calibration groups, the addresses of past data access errors and failures, the current physical and logical configurations of memory cells, and the pending data operations to the memory cells can be utilized individually, and collectively, to understand current namespace configurations and performance as well as future cell arrangements for namespace optimization.

The module controller 332 can operate alone to generate and maintain the various strategies to control current and future namespace workloads, configurations, and data access operations. However, some embodiments employ assorted circuitry to aid the module controller 332 in efficiently creating, altering, and executing the respective output strategies. A workload circuit 334 can assist the module controller 332 in translating the various input information into a workload strategy that has one or more triggers that correspond with a namespace operational policy change in order to mitigate, or eliminate namespace data access performance degradation.

Although not required or limiting, the workload circuit 334 can generate and maintain multiple workload strategies for separate namespaces, which allows for concurrent optimization of the respective namespaces through the execution of different operational policy changes prescribed by the respective namespace strategies in response to detected, or predicted, activity that meets a predetermined workload trigger. For instance, a first namespace may have a first workload strategy generated by the workload circuit 334 that prompts the execution of a first set of namespace operational policy changes, such as customization of namespace configuration, namespace operation, data writing, indexing, compression, journaling, and/or GCU operation, in response to a first trigger being met while a second namespace of a system has a different workload strategy and triggers that prompt a different set of operational policy changes customized to the second namespace based on the workload to that namespace.

A compression circuit 336 can evaluate the configuration and performance of various namespaces to determine what data access performance is being provided and what performance capabilities the hardware channels could provide with assorted metadata compression options. Such evaluation allows the compression circuit 336 to contribute to a metadata strategy with a variety of different data compression operational parameters, such as compression algorithm, compressed size, and compressed data location. The compression options for the metadata strategy allow for buffer utilization optimization, such as volatile memory buffers, by intelligently compressing, or not compressing, metadata.

An update circuit 338 can contribute a variety of reactive and/or proactive actions to the metadata strategy for how metadata is handled after being stored in a namespace. The update circuit 338 may prescribe how metadata is decompressed prior to a read-modify-write operation, the location of updated metadata in a namespace, GCU, and die, or the composition of metadata. For instance, the update circuit 338 can generate multiple metadata update parameters for different namespace workloads that balance the accurate updating of metadata with the data access performance of satisfying queued data access requests.

While the metadata strategy can involve dynamic handling of metadata, it can also involve the intelligent allocation of memory cells. An overprovisioning circuit 340 can populate the metadata strategy with one or more allocations of overprovisioned memory cells. That is, a memory can have a first number of memory cells allocated for overprovisioning operations, such as error recovery, data updates, spare data, or replacement cells, that is altered in accordance with the metadata strategy to accommodate dynamic namespace workloads. As a non-limiting example, the overprovisioning circuit 340 can provide the metadata strategy with different volumes and/or locations of overprovisioned memory cells as well as different manners of utilizing overprovisioned memory cells to optimize metadata generation, handling, and storage in a namespace.

The metadata module 310 can employ a map circuit 342 to adapt how data and/or metadata is mapped in response to different namespace workloads. The map circuit 342 can prescribe a number of different mapping parameters, such as map size, location, content, and tiered organization, in a mapping strategy to control the amount of processing and memory resources consumed for metadata generation and management. As a result of dynamic mapping parameters of the mapping strategy being executed with the preexisting metadata strategy, mapping operations can be balanced with namespace workloads to provide continual optimized data access performance for a namespace.

In some embodiments, the workload circuit 334 can generate and maintain one or more logs of data access activity and memory operations that can be pertinent to identifying current, pending, and future workloads to various zoned namespaces. For instance, the data access frequency (temperature) for an memory cell can initially be logged by the controller 332 before altering the granularity of the temperature tracking to a per-die or per-plane basis, as directed by at least one predetermined strategy. Another non-limiting example logs data access type and frequency to identify if a namespace is hot or cold with respect to host data access requests, which allows the module controller 332 to assign a workload evaluation for a namespace that represents how much activity a namespace is experiencing. It is noted that the module controller 332 may determine various types of workload for assorted data storage system namespaces, such as volume of data accesses over time, amount of processing overhead consumed by accesses to a namespace, or volume of available namespace memory occupied by valid, current user-generated data.

The monitoring of data access and memory activity to determine namespace workloads allows the module controller 332, to generate and maintain a workload strategy that sets one or more workload trigger events that correspond with reactive and/or proactive alterations to current namespace operational policy. That is, a workload strategy can comprise a number of different workload trigger events, such as number of errors, available memory, volume of processing available, or number of memory cell accesses over time, that prompt the execution of one or more namespace operational policy alterations, as prescribed in the namespace strategy, to maintain, mitigate, or reduce the effects of workload volatility on namespace data access performance. The identification and control of namespace workloads allows the namespace module 340 to optimize namespace data access consistency and reliability by customizing how data accesses are conducted to the assorted namespaces of a data storage system.

The execution of one or more strategies generated by the namespace module 310 provides a balance of data access request satisfaction speed with average data access request satisfaction times that meets a predetermined Quality of Service (QoS) standard, deterministic input/output window, or performance threshold. The ability to conduct namespace operational policy changes with the various strategies while the workload strategy identifies and controls the workload actually experienced by assorted logical namespaces of a data storage system allows the namespace module 310 to intelligently adapt to changing memory and data access activity to continually provide performance in accordance with predetermined expectations.

Through the intelligent allocation of memory, the namespace module 310 can provide consistent, reliable data storage and retrieval performance for a namespace. The ability to reactively and/or proactively send data to memory cells having varying performance allows the module 310 to intelligently generate, process, and store metadata to withstand changing data access conditions due to varying memory characteristics and/or data access activity. The generation of assorted aspects of the workload and other strategies can provide sophisticated reactions to encountered namespace workloads as well as proactive actions that mitigate namespace data access performance degradation when conditions and/or activity change.

The proactive generation of the workload and power strategies by the namespace module 310 allows the module controller 332 to execute workload, namespace, and metadata operation control actions quickly and efficiently once a workload trigger is reached. In contrast, purely reactive generation of namespace and/or metadata operation manipulation actions by the namespace module 310 would involve additional processing and time to evaluate and generate the proper action(s) to establish workload control and provide continued namespace data access performance to satisfy one or more predetermined expectations. While the saving of processing overhead, the configuration of the respective workload and read/write asymmetry control strategies with both reactive and proactive actions provide intelligent long-term namespace optimization that cannot be achieved with static namespace utilization policies or purely reactive generation of action(s) to control and optimize the operation of namespaces in view of workload.

The generation of proactive actions and identifying future workload and namespace operational performance for the respective strategies is aided by a prediction circuit 344. A prediction circuit 344 can input assorted current and past operations, actions, and activity, along with model data from other memory, to forecast at least one future namespace operational condition, data access request, or data access performance. The accurate prediction of memory, metadata, and namespace conditions along with data access performance allows the respective strategies generated by the metadata module 310 to have namespace operational policy adaptations to mitigate, or completely avoid, a forecasted future operational occurrence of difference between read and write request satisfaction. The prediction circuit 344 can further forecast how long different strategy actions will take for varying system conditions, which allows the module 310 to quickly adjust between different namespace actions to provide a practical workload control and maintain namespace operational performance without unduly stalling or degrading overall data storage system performance.

Figure 17:
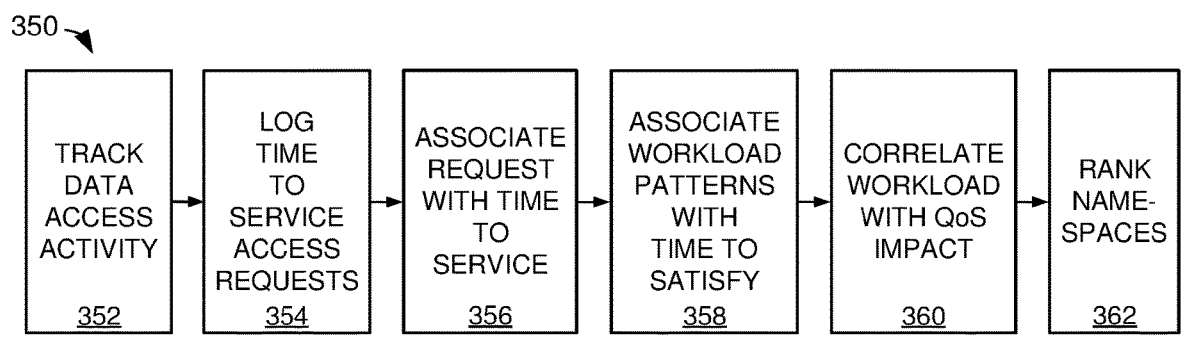
FIG. 17 is a timeline of an example workload procedure that may be conducted in a system in accordance with assorted embodiments.

FIG. 17 depicts an example workload detection procedure 350 that can be carried out in a data storage system via a namespace module in accordance with various embodiments. Data accesses are tracked in step 352 by the namespace module. As such, the namespace module can track assorted data access metrics concurrently or sequentially. The overall time to service a data access request is logged by the namespace module in step 354. It is noted that the overall time to satisfy a data access request is not the only activity tracked in 352, but such activity tracking can be prioritized by redundantly monitoring and interpreting the elapsed time from submission of a data access request by a host to the return of data, in the case of a read request, or the writing of data to a namespace, in the case of a write request.

The logged time to service a data access request can be evaluated in isolation or with the service times of other data access requests to a namespace to determine how long a new data access request to a namespace would take to service. As a result of the logging of actually completed data access requests in step 354 along with the association of new data access requests with an estimated time to service, the namespace module can compile the workload for a namespace. That is, the combination of previously satisfied data access requests and estimated time to service new requests provides enough information for a namespace module to determine the workload for a namespace. Hence, the namespace module generates and maintains a workload value for each namespace that corresponds to how long a data access request takes to be satisfied. A namespace workload further corresponds to the memory cell operational performance of a namespace as well as the current channel and processor capabilities that service memory cells of a namespace.

With the logging of actual request satisfaction times in step 354 and the association of future requests with request satisfaction times in step 356, the namespace module can compile workload values over time for each namespace of a device/system. The tracking of workloads to various namespaces allows the namespace module to identify various workload patterns that reliably indicate future data access request satisfaction times, processing requirements, and buffer memory requirements in step 358. The combination of the determination of namespace workload and the association of workload patterns with future namespace time to satisfy a data access request provides ample information for the namespace module to correlate current namespace workload with an impact to predetermined namespace operational performance and/or power consumption expectations in step 360, such as QoS, deterministic window, error rate, and average data access latency.

Through the tracking of workloads and correlation of those workloads with impact to predetermined namespace operational performance, the namespace module can rank the various available namespaces in step 362 with the aid of the ranking circuit. Such namespace ranking can organize namespaces by availability, efficiency, reliability, read performance, or write performance. For instance, the namespace module can rank namespaces in step 362 by which namespaces can service a request most quickly (availability), with least processing and/or power consumption (efficiency), with least error rate (reliability), read request latency, average request service time, or write request latency. The ranking of namespaces allows the namespace module to generate and adjust namespace optimization strategy policy actions that provide the greatest opportunity to satisfy performance expectations in view of current and future predicted namespace workloads.

Figure 18:
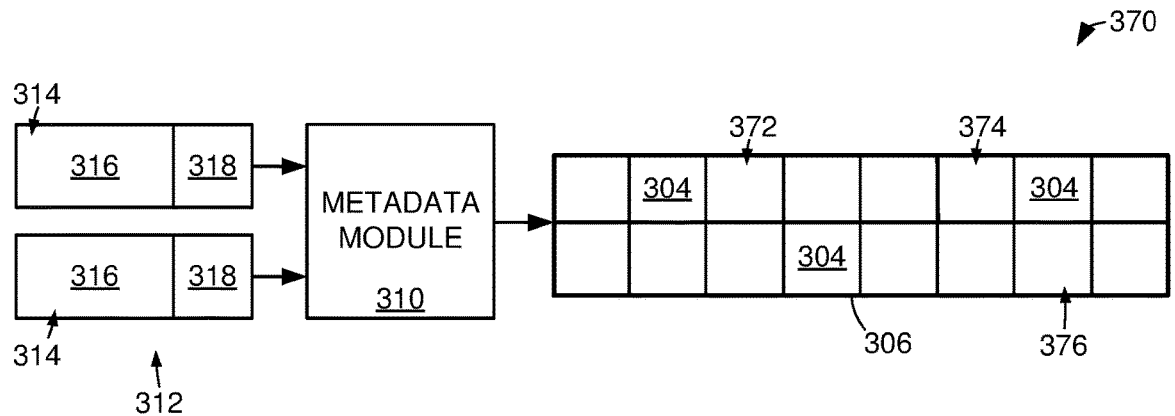
FIG. 18 depicts a block representation of portions of an example system utilized in accordance with some embodiments.

FIG. 18 depicts a block representation of portions of an example data system 370 in which assorted embodiments can be practiced. Although a single data storage device memory 372 is shown in FIG. 18, such configuration is not limiting as numerous separate data storage devices, and memories, can be connected to a metadata module 310 to carry out various data access requests and background operations. A controller of the metadata module 310 can be local to the data storage device, such as physically positioned within a data storage device housing, or remote to the device, such as external to a device housing. The controller can schedule, execute, and monitor a number of different data accesses to satisfy requests from a number of different remote hosts.

Through operation of the controller, one or more data access performance volatilities can exist that pose difficulties for satisfying predetermined data access performance expectations for one or more namespaces 372/374/376. Accordingly, the controller can monitor past, current, and pending data access activity to one or more namespaces to determine the real-time namespace workload. The computation and monitoring of namespace workloads allows the controller to react to elevated levels of namespace workload by changing one or more metadata operational policies in an effort to reduce the effect of metadata generation and handling on data access performance to at least one namespace 372/374/376.

Among the metadata operational policy changes that can be executed in response to a namespace workload threshold being met, a selective metadata compression scheme can be implemented. For instance, metadata can be selectively compressed, remain uncompressed, or compressed with different compression parameters, as prescribed by a metadata strategy and executed by the metadata module 310. It is contemplated that the selective portions of metadata compression can depend on one or more detected, or predicted, operational aspects, such as the security of data, temperature of data, location of data, size of metadata, and past performance of a namespace 372/374/376.

Hence, the metadata module 310 can react to a namespace workload by altering a metadata compression policy to compress metadata with a different compression parameter, not compress metadata at all, or compress different metadata differently. A non-limiting example involves metadata with a first namespace 372 destination being compressed while metadata with a second namespace 374 destination not being compressed and metadata with a third namespace 376 destination being compressed with compression parameters dictated by the namespace's workload in order for the namespace 376 to maintain consistent data access performance.

The execution of a metadata strategy with the metadata module 310 may alternatively, or additionally, update metadata already stored in a memory with policies altered in view of a namespace's workload. A metadata strategy can adapt how metadata is updated to the workload of a namespace. For instance, the metadata strategy can dictate what type of compression is used for updates, which may alter an existing metadata compression for updates. In the event an update to metadata results in a larger volume of metadata, the metadata strategy can prescribe an alternate location for some, or all, of the updated metadata. An alternate location may be a different namespace 372/374/376, GCU, plane, or die. It is contemplated that overprovisioned memory cells can be temporarily, or permanently, utilized for portions of updated metadata.

The ability to move some, or all, of an updated metadata can allow metadata to remain in an originally assigned physical and logical address relative to a user-generated payload. For example, updated metadata that is larger than the previous metadata would necessitate a move of the entire metadata to a conducive physical address, which may correspond with a different logical address, while separating portions of updated metadata to two different physical addresses can allow for sophisticated manners of storing and retrieving the metadata, such as from different portions of memory, namespaces, die, and/or GCU. As a result, retrieval of the user-generated payload portion of a data set efficiently returns portions of the updated metadata while the remaining, separate portions of the updated metadata can be concurrently or sequentially retrieved efficiently due to the parallel paths from different memories, die, namespaces, and/or GCU.

The intelligent operation of the metadata module 310 can selectively arrange and utilize overprovisioned portions of memory to provide at least optimal metadata management. In accordance with a metadata strategy, overprovisioned portions of a memory can be reserved and unavailable for host access or the storage of host-generated data. Such overprovisioned portions can be employed permanently in the event of a memory cell failure or temporarily in the execution of assorted data and memory management operations, such as garbage collection, error recovery, and mapping.

While it is contemplated that a physical range of addresses of memory can be initially reserved as overprovisioned memory and employed when needed, various embodiments allow the metadata module 310 to dynamically assign and utilize overprovisioned memory cells to optimize the generation and handling of metadata. As a non-limiting example, sequential writes that are too big to be efficiently written to a plane, die, namespace, or GCU can be temporarily allocated overprovisioned memory cells to allow time for the metadata module 310 to reorganize the data at a later time, such as a subsequent update to the payload and/or metadata portions of the sequential write.

The ability to manipulate what portions of memory that are reserved as overprovisioned cells as well as how those overprovisioned portions are utilized allows the metadata module 310 to intelligently alter operational policies, such as metadata generation, processing, and storage, to minimize, or eliminate, degradation of data access performance for various namespace workloads. An example intelligent utilization of overprovisioned memory involves the metadata module 310 allocating different portions of different namespaces as reserved, overprovisioned ranges of physical data addresses over time as the respective namespaces fill with data and/or undergo workloads that could degrade performance if current metadata operational policy is employed.

Through the intelligent handling of metadata, updates, and overprovisioned memory by the metadata module 310 in accordance with one or more preexisting metadata strategies, operational policy changes can be implemented that maintain optimal data access performance for namespaces despite dynamic workloads. In contrast, a static operational policy that is agnostic with respect to namespace workloads can suffer from degraded data access performance and/or risk data loss in the event of an unexpected power loss due to pending, unwritten payload and/or metadata. Hence, the processing expense associated with generating a metadata strategy can provide efficient execution of the strategy once namespace workloads reach predetermined triggers to provide lossless metadata management, storage, and retrieval.

Figure 19:
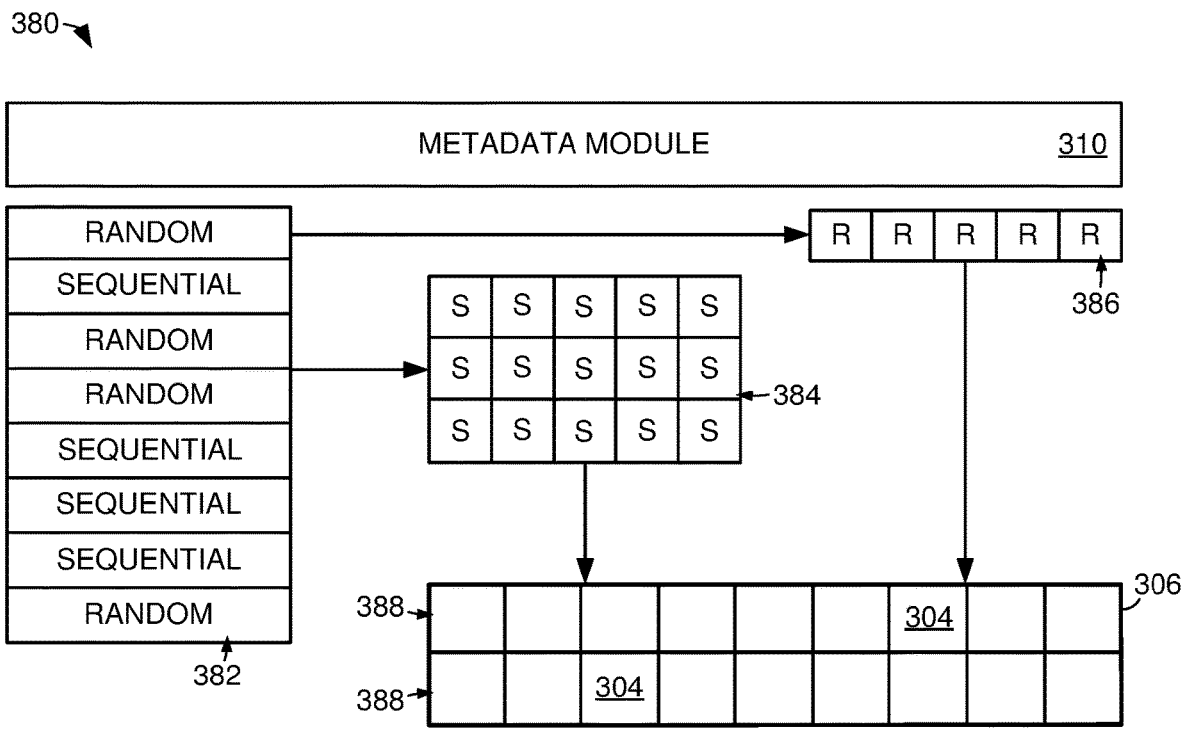
FIG. 19 conveys a block representation of portions of an example system employed in accordance with various embodiments.

The metadata module 310 is not relegated to generation and implementation of metadata strategies. Various embodiments employ the metadata module 310 to provide adaptive mapping of data stored in one or more zoned namespaces. FIG. 19 depicts a block representation of portions of an example data system 380 in which a metadata module 310 operates to provide intelligent adaptive mapping. As shown, a queue 382 of pending data access requests can consist of assorted reads and writes that are sequential or random. That is, data access requests can be submitted by a host as to be written sequentially to consecutive physical block addresses or agnostic as to what physical block addresses are used (random).

When sequential and random data writes are processed in the order in which they are received by the queue 382, data access performance can suffer as metadata is generated, stored, and mapped. The difficulties of consistent data access performance while mapping assorted combinations of sequential and random data writes to a namespace can further be exacerbated by varying namespace workloads. Accordingly, the metadata module 310 can generate and execute a mapping strategy that responds to workload trigger(s) being reached by altering existing mapping policy to provide consistent data access performance to at least one namespace.

In the non-limiting mapping strategy depicted in FIG. 19, the metadata module 310 can separate pending sequential (S) and random (R) writes into different buffers 384/386 so that different compression schemes can be applied. The ability to intelligently choose buffer 384/386 sizes and compression schemes for the respective sequential and random writes allows the metadata module 310 to adapt to varying namespace workloads by controlling the processing, time, and memory allocation used to satisfy pending data accesses. It is contemplated that a mapping strategy assigns different buffer sizes according to the type of write request, such as 1 k of space for random writes and 16 k of space for sequential writes. Similarly, a mapping strategy can dictate that data is mapped after being compressed by predetermined compression parameters, such as type, algorithm, and key. The adaptive handling, buffering, and compression of different types of pending data writes allows metadata to be efficiently created and mapped due to the fundamental differences between sequential and random data writes.

A mapping strategy can prescribe tiers of payload, metadata, and/or compressed data. By tiering maps that describe user-generated payloads, metadata, or both, a metadata module 310 can manipulate how much processing, time, and memory space resources are utilized to translate written data into simplified information pertaining to the location of data. For instance, a mapping strategy can dictate that a tiered mapping structure is utilized for a namespace until a workload trigger is encountered and a single-level map is temporarily utilized for the namespace thereafter. The intelligent and adaptive capabilities of executing a mapping strategy based on detected, and/or predicted, namespace workload ensures mapping operations do not degrade data access performance of the namespace.

Figure 20:
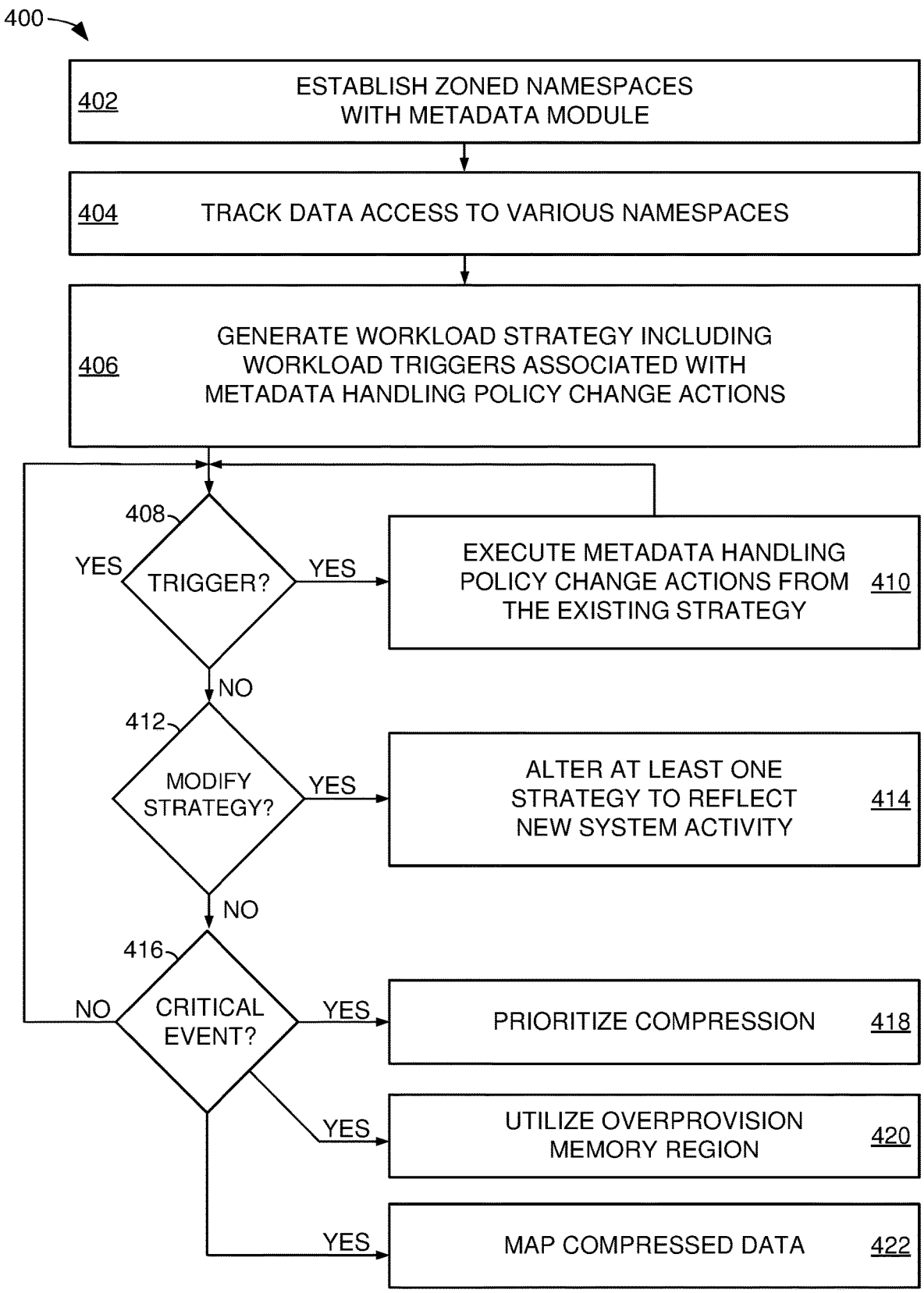
FIG. 20 is a flowchart of an example metadata routine that can be carried out with some embodiments of FIGS. 1-19.

FIG. 20 conveys an example workload-based metadata routine 400 that can be carried out with the assorted embodiments of FIGS. 1-19 to provide lossless metadata generation, handling, storage, and retrieval. Connection of a namespace module to a memory, such as a solid-state data storage device, allows for the initialization of the memory to service data access requests from hosts external to the memory, such as a third-party user. The namespace module establishes zoned namespaces in step 402 that can occupy any physical and logical data block addresses in one or more data storage devices, die of memory cells, and planes of memory cells. Activity to the zoned namespaces established in step 402 is subsequently tracked in step 404 by the metadata module to determine the capabilities, current performance, and operational configuration of the memory cells of the assorted namespaces. It is noted that the metadata module can track any number of different data access and memory behavior metrics over time.

The tracked data access activity and memory characteristics compiled by the metadata module from step 404 allows the metadata module to assign workload values to the respective namespaces that correspond with at least the volume of data accesses conducted on a namespace for a given length of time. An assigned namespace workload value may be more sophisticated, as directed by the metadata module, and can include a compilation of memory cell efficiency and/or reliability with availability. The ability to adapt the tracking of activity for a namespace and the generation of a workload value for the namespace allows the metadata module to conduct more, or less, rigorous processing and time to determine how much capability of a namespace is occupied by data access operations initiated by external hosts as well as background memory operations, such as garbage collection, memory refresh, and data mapping.

The generated workloads are monitored over time by the metadata module while a workload strategy is generated in step 406. The workload strategy establishes when various namespaces can benefit from reactive and/or proactive operational metadata policy changes that provide data access performance manipulation and sets a workload trigger to prompt execution of at least one policy change action as prescribed by a metadata strategy. With one or more workload triggers set for each namespace while each namespace workload is compiled and tracked by the metadata module, decision 408 can determine if a workload trigger has been met, is imminently met, or is predicted to be met with a sufficiently high reliability. That is, the metadata module can associate workload values for the assorted namespaces of a data storage system with workload trigger thresholds that can be previously, currently, or likely met, which prompts step 410 to execute one or more operational metadata policy change that alters how metadata is generated, processed, stored, and retrieved by manipulating metadata size, location, updates, compression, and mapping in response to the workload trigger being met.

The execution of a metadata operational policy change can involve a diverse variety of actions. The reactive or proactive nature of the policy change actions in step 410 can be conducted any number of times as routine 400 returns to decision 408 to monitor if a workload trigger is reached. While decision 408 monitors namespace workload over time for triggers, decision 412 can evaluate if an existing workload and/or metadata strategy can be improved through modification.

The evaluation of decision 412 can involve comparing recent workload activity with the activity predicted when the workload and metadata strategies were generated. Alternatively, decision 412 can involve comparing current memory performance with the performance capabilities when the workload and metadata strategies were generated. A determination that the current strategies are not optimal for the current and predicted namespace workloads and/or memory cell capabilities prompts step 414 to alter at least the metadata strategy to reflect the new system conditions. It is noted that step 414 may generate a completely new strategy, or simply modify one or more namespace operational policy change actions that correspond with altered data access performance characteristics.

A metadata module may also passively evaluate if an inadvertent and/or unscheduled critical event, such as power loss, hardware failure, or software failure, is imminent in decision 416. That is, the metadata module can determine that a critical event is imminent and utilizes the remaining stored energy in the highest ranked namespaces with the highest ranked hardware to conduct one or more critical metadata processing operations. For instance, portions of a strategy can be executed in step 418 that prioritize compression of metadata, user-generated payloads, or both. A critical event may, alternatively or additionally, utilize overprovisioned portions of memory for temporary data storage in step 420 to ensure queued, unwritten data is not lost due to a power loss or other system failure. In the event no pending data is available for compression or storage in overprovisioned regions of memory during a critical event, step 422 can map compressed data to allow for more efficient and accurate recovery from the critical event.

The utilization of a metadata module with a data system provides lossless metadata handling intelligently corresponding to workloads to logical namespaces. By generating at least a metadata strategy with actions directed to mitigate data access performance degradation, sophisticated metadata manipulation can provide balance between processing, time, and memory space used for metadata with the resources employed for data access operations. The ability to modify the content of metadata, location of metadata, compression of metadata, and mapping of metadata allows a metadata module to provide lossless metadata processing while accommodating dynamic workloads to various namespaces of a data system. That is, the intelligent adaptation of metadata operational policy in response to workloads tracked by the metadata module ensures that executed actions provide a practical balance between expended system processing resources and increased capability to satisfy namespace performance expectations with minimal processing and time resources being consumed by metadata.

What is claimed is:

1. A method comprising:
arranging a plurality of memory cells into a plurality of logical namespaces;
logging data access activity to at least one logical namespace of the plurality of logical namespaces with a metadata module;
determining a workload to each namespace;
creating a metadata strategy with the metadata module in view of the respective namespace workloads;
generating first metadata for first user-generated data for storage into a first namespace of the plurality of logical namespaces, the first metadata providing a first map structure that identifies a physical location of the first user-generated data in the first namespace;
generating second metadata for second user-generated data for storage into the first namespace, the second metadata providing a second map structure that identifies a physical location of the second user-generated data in the second namespace;
compressing the first metadata with a compression level prescribed by the metadata strategy in response to a detected workload to the first namespace; and
storing the compressed first metadata, second metadata, first user-generated data, and second user-generated data into the first namespace.

2. The method of claim 1, wherein the plurality of memory cells are located in different data storage devices.

3. The method of claim 1, wherein the plurality of memory cells are distributed across different die of a single data storage device.

4. The method of claim 1, wherein the metadata module comprises a controller and a workload circuit to select the compression level applied to the first metadata.

5. The method of claim 1, further comprising compressing the second metadata using a different compression level than the compression level used to compress the first metadata, and wherein the storing of the second metadata comprises storing the compressed second metadata to the first namespace.

6. The method of claim 1, further comprising generating an uncompressed set of metadata comprising a map or a journal that identifies a location at which the compressed first metadata are stored within the first namespace.

7. The method of claim 6, further comprising servicing a subsequent read request from a host for the first user-generated data by using the uncompressed set of metadata to locate and retrieve the compressed first metadata, uncompress the compressed first metadata to provide an uncompressed representation of the first map structure, and using the uncompressed representation of the first map structure to locate and transfer the first user-generated data from the first namespace to the host.

8. The method of claim 1, further comprising performing a read-modify-write operation upon the first user-generated data to modify the compressed first metadata to generate updated compressed first metadata, and evaluating a change in size of the updated compressed first metadata as compared to the compressed first metadata.

9. The method of claim 1, wherein the metadata module is further configured to generate a predicted workload in the near future for each of the plurality of logical namespaces, and to select a corresponding metadata compression level to be used to compress metadata to each corresponding one of the plurality of logical namespaces responsive to the predicted workload.

10. The method of claim 8, wherein the updated compressed metadata is stored to the first namespace responsive to a determination that the size of the updated compressed first metadata is equal to or less than that of the compressed first metadata.

11. The method of claim 8, wherein at least a portion of the updated compressed metadata is stored to a different, second namespace responsive to a determination that the size of the updated compressed first metadata is greater than that of the compressed first metadata.

12. The method of claim 1, wherein the metadata strategy alters an overprovision region of memory associated with the first namespace in response to the predicted workload, the overprovision region of memory used to accommodate storage of at least a portion of the compressed first metadata.

13. The method of claim 1, further comprising compressing the first user-generated data prior to storage thereof to the first namespace using a second compression level different from the compression level used to compress the compressed first metadata.

14. An apparatus comprising:
a non-volatile memory (NVM) comprising a plurality of memory cells arranged into a plurality of namespaces; and
a controller circuit configured to transfer data blocks between the NVM and a host, the controller circuit operative to monitor a workload from the host for each namespace, generate metadata for a set of data blocks to be stored to a selected namespace with the metadata providing a map structure that identifies a physical location at which the set of data blocks are to be stored in the selected namespace, select a compression level for the metadata responsive to the workload associated with the selected namespace, compress the metadata using the selected compression level to generate compressed metadata, and store the compressed metadata and the set of data blocks to the selected namespace, the selected compression level balancing the workload and memory storage capacity required to store the set of data blocks and the rate at which the set of data blocks can be accessed.

15. The apparatus of claim 14, wherein the controller circuit is further operative to subsequently retrieve, uncompress, use, modify, and recompress the compressed metadata to form updated compressed metadata responsive to a read-write-modify operation upon the set of data blocks in which the set of data blocks are updated by the host, and to store the recompressed metadata to the NVM responsive to a comparison of an overall size of the recompressed metadata to an overall size of the compressed metadata.

16. The apparatus of claim 15, wherein the overall size of the recompressed metadata is determined by the controller circuit to be the same or less than the overall size of the compressed metadata, and wherein the controller circuit proceeds to store the recompressed metadata to the selected namespace adjacent the updated set of data blocks.

17. The apparatus of claim 15, wherein the overall size of the recompressed metadata is determined by the controller circuit to be greater than the overall size of the compressed metadata, and wherein the controller circuit proceeds to store at least a portion of the recompressed metadata to a different, second namespace that can be accessed concurrently using a different channel than a channel used to access the selected namespace to facilitate retrieval of the recompressed metadata to service a subsequent request.

18. The apparatus of claim 14, further comprising using the controller circuit to generate second metadata to provide a second map structure to identify a physical location at which a second set of data blocks are to be stored in the selected namespace, wherein the second metadata and the second set of data blocks are stored to the selected namespace, and wherein the second metadata remain uncompressed responsive to a predicted difference in utilization requirements for the second set of data blocks as compared to the set of data blocks.

19. The apparatus of claim 14, wherein the controller circuit is further configured to generate an uncompressed set of metadata comprising a map or a journal that identifies a location at which the compressed metadata are stored within the selected namespace, and to subsequently service a read request from the host for the set of data blocks by using the uncompressed set of metadata to locate and retrieve the compressed metadata, uncompress the compressed metadata to provide an uncompressed representation of the map structure, and using the uncompressed representation of the map structure to locate and transfer the set of data blocks from the selected namespace to the host.

20. The apparatus of claim 14, characterized as a solid-state drive (SSD), the NVM characterized as a flash memory, the controller circuit comprising at least one programmable processor with associated program instructions stored in a memory.

* * * * *